US012603811B2

(12) United States Patent
Kosugi

(10) Patent No.: US 12,603,811 B2
(45) Date of Patent: Apr. 14, 2026

(54) AUTO-HEALING CONTROL IN CONSIDERATION OF TYPE OF NETWORK PROBLEM

(71) Applicant: Rakuten Mobile, Inc., Tokyo (JP)

(72) Inventor: Masaaki Kosugi, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 29 days.

(21) Appl. No.: 18/756,753

(22) Filed: Jun. 27, 2024

(65) Prior Publication Data

US 2025/0293916 A1 Sep. 18, 2025

(30) Foreign Application Priority Data

Mar. 14, 2024 (JP) ................................. 2024-039946

(51) Int. Cl.
| | |
|---|---|
| *G06F 15/173* | (2006.01) |
| *H04L 41/0654* | (2022.01) |
| *H04L 41/0816* | (2022.01) |
| *H04L 41/122* | (2022.01) |

(52) U.S. Cl.
CPC ...... H04L 41/0654 (2013.01); H04L 41/0816 (2013.01); H04L 41/122 (2022.05)

(58) Field of Classification Search
CPC .............. H04L 41/0654; H04L 41/122; H04L 41/0816
See application file for complete search history.

(56) References Cited

U.S. PATENT DOCUMENTS

| | | | |
|---|---|---|---|
| 11,088,916 B1* | 8/2021 | Chandrashekhar ..... | G06F 9/547 |
| 2018/0018193 A1 | 1/2018 | Yabushita et al. | |
| 2021/0319158 A1* | 10/2021 | Bhattacharyya ... | G06Q 30/0205 |
| 2025/0232297 A1* | 7/2025 | Goyal ................. | G06Q 20/401 |

FOREIGN PATENT DOCUMENTS

WO 2016/121830 A1 8/2016

* cited by examiner

*Primary Examiner* — Joseph R Maniwang
(74) *Attorney, Agent, or Firm* — Sughrue Mion, PLLC

(57) ABSTRACT

A network management apparatus includes at least one processor. The processor is configured to execute a reception process of receiving a signal supplied when a problem is detected in any of a plurality of logical networks in a network virtualization environment, and a first determination process of determining not to perform auto-healing in a case in which a problem is detected in a first logical network that is configured for platform monitoring and a problem is not detected in a second logical network that is configured for application monitoring.

7 Claims, 10 Drawing Sheets

| PROBLEM PATTERN / NETWORK | 1 | 2 | 4 | 5 | DETERMI-NATION RESULT |
|---|---|---|---|---|---|
| 1 | 0 | 0 | 0 | 0 | - |
| 2 | 0 | 0 | 0 | 1 | B |
| 3 | 0 | 0 | 1 | 0 | B |
| 4 | 0 | 0 | 1 | 1 | B |
| 5 | 0 | 1 | 0 | 0 | A |
| 6 | 0 | 1 | 0 | 1 | B |
| 7 | 0 | 1 | 1 | 0 | B |
| 8 | 0 | 1 | 1 | 1 | B |
| 9 | 1 | 0 | 0 | 0 | A |
| 10 | 1 | 0 | 0 | 1 | B |
| 11 | 1 | 0 | 1 | 0 | B |
| 12 | 1 | 0 | 1 | 1 | B |
| 13 | 1 | 1 | 0 | 0 | A |
| 14 | 1 | 1 | 0 | 1 | B |
| 15 | 1 | 1 | 1 | 0 | B |
| 16 | 1 | 1 | 1 | 1 | B |

0: THERE IS NO NETWORK PROBLEM

1: THERE IS NETWORK PROBLEM

| MONITORED ITEM | THRESHOLD VALUE |
|---|---|
| ACCOMMODATED USER COUNT DECREASE RATE | T1 |
| PACKET LOSS RATE INCREMENT | T2 |
| CPS DECREASE RATE | T3 |

AUTO-HEALING CONTROL IN CONSIDERATION OF TYPE OF NETWORK PROBLEM

CROSS-REFERENCE TO RELATED APPLICATION(S)

This application claims priority to Japanese patent application No. 2024-039946, filed on Mar. 14, 2024; the entire contents of which are incorporated herein by reference.

TECHNICAL FIELD

The present disclosure relates to auto-healing control in consideration of a type of a network problem.

BACKGROUND

The information disclosed in this background section is only for enhancement of understanding of the general background of the disclosure and should not be taken as an acknowledgement or any form of suggestion that this information forms the prior art already known to a person skilled in the art.

Cloud computing (referred to as a "cloud" below) in which computing resources virtualized on physical resources such as servers are used on demand has become widely spread against the background of improvement in performance of general-purpose servers and enrichment of network infrastructure. In addition, network function virtualization (NFV) in which network functions are virtualized and provided on a cloud is known. NFV is a technology in which a virtualization technology and a cloud technology are used to separate hardware and software of various network services that have been running on dedicated hardware until now and to run the software on a virtualized infrastructure. With NFV, it is expected to enhance operation and reduce costs.

In recent years, virtualization has also been promoted in mobile networks.

In European Telecommunications Standards Institute (ETSI) NFV, an architecture of NFV is defined (see WO 2016/121830 A, for example).

SUMMARY OF THE INVENTION

In auto-healing defined by ETSI NFV or the like, in a case in which a problem is detected, a VNF/CNF having the problem is automatically saved on a normal hardware resource, thereby enabling quick service recovery. In auto-healing, a VNF or CNF having a problem is deleted, other hardware resources are deployed for the VNF or CNF (creating the VNF or CNF), and settings to optimize the operation of the VNF or CNF are performed.

Thus, the availability of a service temporarily decreases during a period from an occurrence of the problem to the completion of auto-healing (until the recovered VNF/CNF is incorporated into the operation and the service can be resumed).

Generally, problems that trigger auto-healing are roughly classified into two types. One type is a problem (such as a physical problem) of a hardware resource on which the VNF/CNF operates, and the other type is a problem (such as a software bug in an application) of the VNF/CNF itself.

Conventionally, a problem of a network in a virtualization environment (for example, a problem of an interface between components) is not considered as a trigger for auto-healing. In addition, as described above, the availability of the service temporarily decreases during the period from the occurrence of the problem to the completion of auto-healing.

Accordingly, the present disclosure provides a technique for appropriately determining whether or not auto-healing is conducted in consideration of a type of a network problem when the network problem has occurred in a virtualization environment.

According to an aspect of the present disclosure, there is provided a network management apparatus. The network management apparatus includes at least one processor. The processor is configured to execute a reception process of receiving a signal supplied when a problem is detected in any of a plurality of logical networks in a network virtualization environment, and a first determination process of determining not to perform auto-healing in a case in which a problem is detected in a first logical network that is configured for platform monitoring and a problem is not detected in a second logical network that is configured for application monitoring.

According to another aspect of the present disclosure, there is provided a network management method. The network management method includes receiving a signal supplied when a problem is detected in any of a plurality of logical networks in a network virtualization environment; and determining not to perform auto-healing in a case in which a problem is detected in a first logical network that is configured for platform monitoring and a problem is not detected in a second logical network that is configured for application monitoring.

In the aspects of the present disclosure, in a case in which a problem has occurred in a network implemented in a virtualization environment, it is possible to appropriately determine whether or not auto-healing is conducted in consideration of the type of the network problem. Then, by limiting unnecessary performing of auto-healing, the availability of a network is improved as compared with a case in which auto-healing is not limited.

BRIEF DESCRIPTION OF THE DRAWINGS

Features, aspects, and advantages of embodiments of the disclosure will be described below with reference to the accompanying drawings, in which like reference numerals denote like elements, and wherein:

FIG. 16 is a sequence diagram illustrating another example of the process in the network virtualization environment according to the present disclosure;

FIG. 18 is a table illustrating examples of monitored items for determining whether or not a problem is further detected according to a command of the determination device.

DETAILED DESCRIPTION

Figure 1:
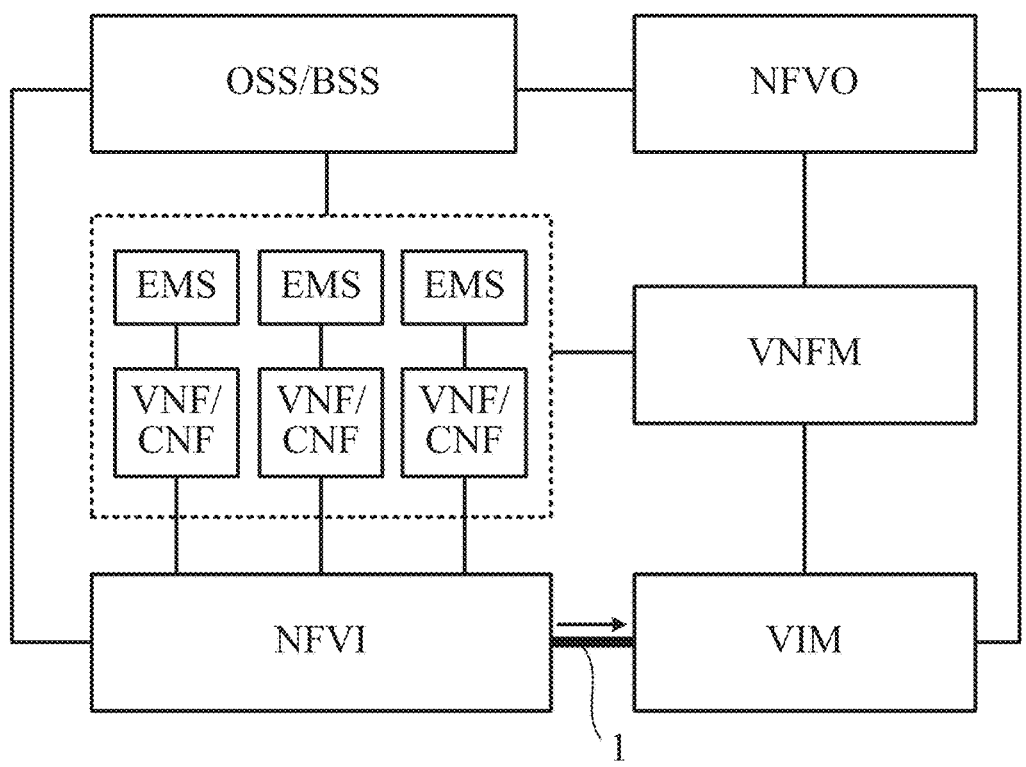
FIG. 1 is a block diagram illustrating components in a network virtualization environment defined by ETSI NFV, and particularly illustrates a platform monitoring network between a VIM and an NFVI in an emphasized manner.

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, the flowchart and description of operations provided below relate to one of the various embodiments. It should be noted that it is possible to make other embodiments that do not exactly match the flowchart and its description. It is understood that in other embodiments one or more operations may be omitted, one or more operations may be added, one or more operations may be performed simultaneously (at least in part).

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of implementations. In fact, many of these features may be combined in ways not specifically recited in the claims and/or disclosed in the specification. Although each dependent claim listed below may directly depend on only one claim, the disclosure of implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]," "[A] and/or [B]," or "at least one of [A] or [B]" are to be understood as including only A, only B, or both A and B.

The foregoing disclosure provides illustration and description but is not intended to be exhaustive or to limit the implementations to the precise form disclosed. Modifications and variations are possible in light of the above disclosure or may be acquired from practice of the implementations.

Hereinafter, embodiments according to the present disclosure will be described with reference to the accompanying drawings.

FIGS. 1 to 7 are block diagrams illustrating components in a network virtualization environment defined by ETSI NFV.

Solid lines in FIGS. 1 to 7 represent logical connections between components.

A virtual network function (VNF) corresponds to an application or the like operating in a virtual machine (VM) on a server, and implements network functions such as a directory service, a router, a firewall, and a load balancer in a software manner. As the VNF, an element of an evolved packet core (EPC) which is a core network of a mobile network or an element of an IP multimedia subsystem (IMS) may be implemented by software (virtual machine).

A containerized network function or cloud-native network function (CNF) is an evolved form of the VNF, corresponds to an application or the like operating in a container on a server, and implements a network function in a software manner. As the CNF, an element of the EPC or an element of the IMS may be implemented by software (container).

Hereinafter, "VNF/CNF" means "VNF" or "CNF".

An element management system (EMS) is a management function for each VNF/CNF. Each EMS is connected to a corresponding VNF/CNF to monitor the VNF/CNF.

A network function virtualization infrastructure (NFVI) forms an execution basis of the VNF/CNF. The NFVI is a base that enables flexible handling as virtualized hardware resources such as virtualized computing, virtualized storage, and virtualized network in which hardware resources of physical machines (servers) such as computing, storage, and network functions are virtualized in a virtualization layer such as a hypervisor.

In practice, a plurality of NFVIs are provided, and each NFVI is connected to a plurality of VNFs/CNFs to monitor the VNFs/CNFs.

A virtualized infrastructure manager (VIM) serves as a cloud controller. That is, the VIM controls the NFVI via a virtualization layer (performs computing, storage, network resource management, problem monitoring of the NFVI that is an execution basis of the NFV, resource information monitoring, and the like).

In practice, a plurality of VIMs are provided, and each VIM is connected to a large number of NFVIs to monitor the NFVIs.

A VNF Manager (VNFM) manages VNFs/CNFs. Specifically, the VNFM controls the NFVI via the virtualization layer (performs computing, storage, network resource management, problem monitoring of the NFVI, resource information monitoring, and the like).

In practice, a plurality of VNFMs are provided, and each VNFM is connected to a plurality of VNFs/CNFs and a plurality of VIMs to monitor the VNFs/CNFs and the VIMs.

An NFV orchestrator (NFVO) performs orchestration of NFVI resources, management of network resources, and management of network services. The NFVO has a repository of NFV instances and a repository of NFVI resources.

The NFVO is connected to a plurality of VNFMs and a plurality of VIMs to monitor the VNFMs and the VIMs.

The NFVO has a function of transmitting a command for auto-healing to a component related to the auto-healing in order to recover a VNF/CNF having a problem, in a case of receiving a report indicating that the component of a virtualization environment has the problem.

The NFVO, the VNFM, and the VIM constitute a management and orchestration (MANO). The MANO has a management function of a virtualization environment and an orchestration function.

An operations support system (OSS) is a system (device, software, mechanism, or the like) necessary for a communication company (carrier) to construct and operate a service. A business support system (BSS) is an information system (device, software, mechanism, or the like) used by a communication company (carrier) for charging, billing, customer service, and the like.

The OSS and the BSS function in cooperation with each other, and may be provided integrally and inseparably. In the following description, "OSS/BSS" means a system including both an OSS and a BSS, but the OSS and the BSS may be separately provided.

The OSS/BSS is connected to the NFVO and is connected to a plurality of EMSs.

In some virtualization environments, some (including control of auto-healing) of the functions of the NFVO may be performed in the OSS. In a case in which the OSS performs functions related to reception of a report of a problem related to auto-healing and a command for auto-healing (control of auto-healing), a connection corresponding to the solid line between the OSS/BSS and the NFVO in the drawings is used to receive the report and transmit the command.

That is, the control of auto-healing is executed by the OSS or the NFVO. In the following description, "OSS/NFVO" means the OSS or the NFVO.

Logical networks used for implementing auto-healing are classified into networks emphasized by thick solid lines in FIGS. 1 to 6, and all networks are connected to the OSS/NFVO that controls auto-healing. The OSS/NFVO determines whether or not to perform auto-healing from information obtained via these networks.

The thick solid line in FIG. 1 indicates a platform monitoring network (first logical network) 1 between the VIM and the NFVI. Each VIM is connected to a plurality of NFVIs, and the NFVI uses the network 1 to report a problem of a hardware resource on which the VNF/CNF operates. That is, each VIM monitors the subordinate NFVI by using the network 1.

Figure 2:
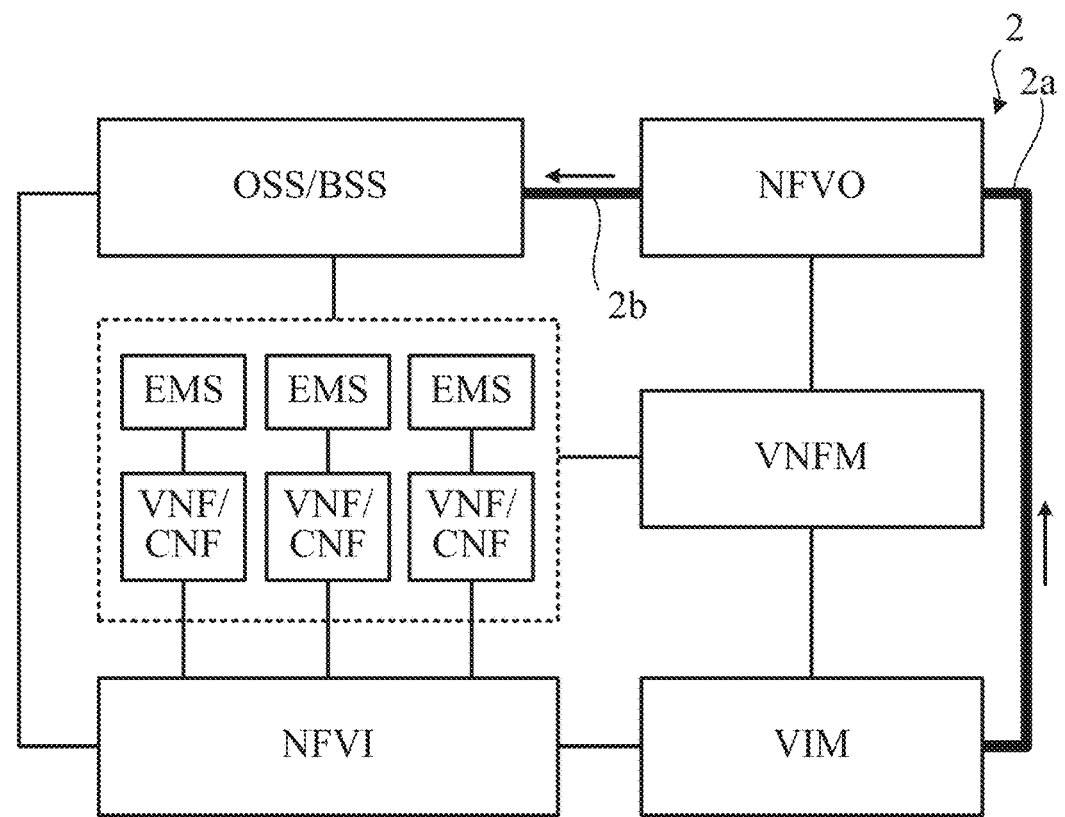
FIG. 2 is a block diagram illustrating the above components, and particularly illustrates a platform monitoring network between an OSS/NFVO and the VIM in an emphasized manner.

The thick solid line in FIG. 2 indicates a platform monitoring network (first logical network) 2 between the OSS/NFVO and the VIM. The platform monitoring network 2 includes a network 2a between the NFVO and the VIM. In a case in which the OSS controls auto-healing, the platform monitoring network 2 further includes a connection 2b between the OSS and the NFVO.

The NFVO is connected to a plurality of VIMs, and each VIM reports a problem of a hardware resource reported from the NFVI via the platform monitoring network 1 to the NFVO by using the network 2a. In a case in which the OSS controls auto-healing, the NFVO transfers a problem report to the OSS via the connection 2b.

As described above, the platform monitoring networks 1 and 2 are used for reporting a problem of a hardware resource on which the VNF/CNF operates.

Figures 3, 4:
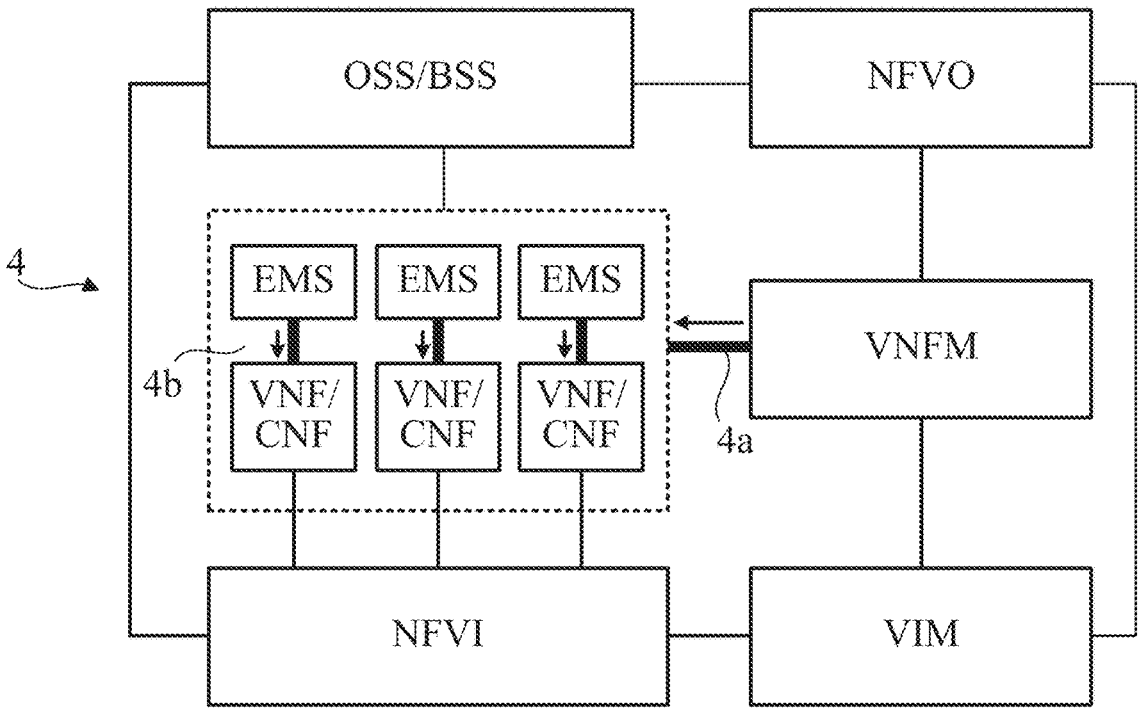
FIG. 3 is a block diagram illustrating the above components, and particularly illustrates a platform control network between the OSS/NFVO and the VIM in an emphasized manner.
FIG. 4 is a block diagram illustrating the above components, and particularly illustrates an application monitoring network between an EMS/VNFM and a VNF/CNF in an emphasized manner.

The thick solid line in FIG. 3 indicates a platform control network 3 between the OSS/NFVO and the VIM. The platform control network 3 includes a network 3a between the NFVO and the VIM. In a case in which the OSS controls auto-healing, the platform control network 3 further includes a connection 3b between the OSS and the NFVO. That is, the same components as those of the platform monitoring network 2 of FIG. 2 are involved in the platform control network 3.

The platform control network 3 is used to supply a command to delete a VNF/CNF having a problem and deploy other hardware resources for the VNF/CNF (create a VNF/CNF) in auto-healing. In a case in which the OSS controls auto-healing, the OSS supplies a command to the NFVO via the connection 3b. The NFVO supplies a command to the VIM corresponding to the VNF/CNF having a problem via the network 3a.

The thick solid line in FIG. 4 indicates an application monitoring network (second logical network) 4 between the EMS/VNFM and the VNF/CNF. "EMS/VNFM" means the EMS or the VNFM. The application monitoring network 4 includes a network 4a between the VNFM and the VNF/CNF and a connection 4b between the EMS and the VNF/CNF.

Each VNFM is connected to a plurality of VNFs/CNFs, to monitor an application of a subordinate VNF/CNF by using the network 4a. Each EMS is connected to the corresponding VNF/CNF to monitor an application of the VNF/CNF via the connection 4b. The application monitoring network 4 is used for reporting an application problem.

Depending on an application product used in the virtualization environment, the network 4a or the connection 4b may not be used for reporting the application problem.

Figure 5:
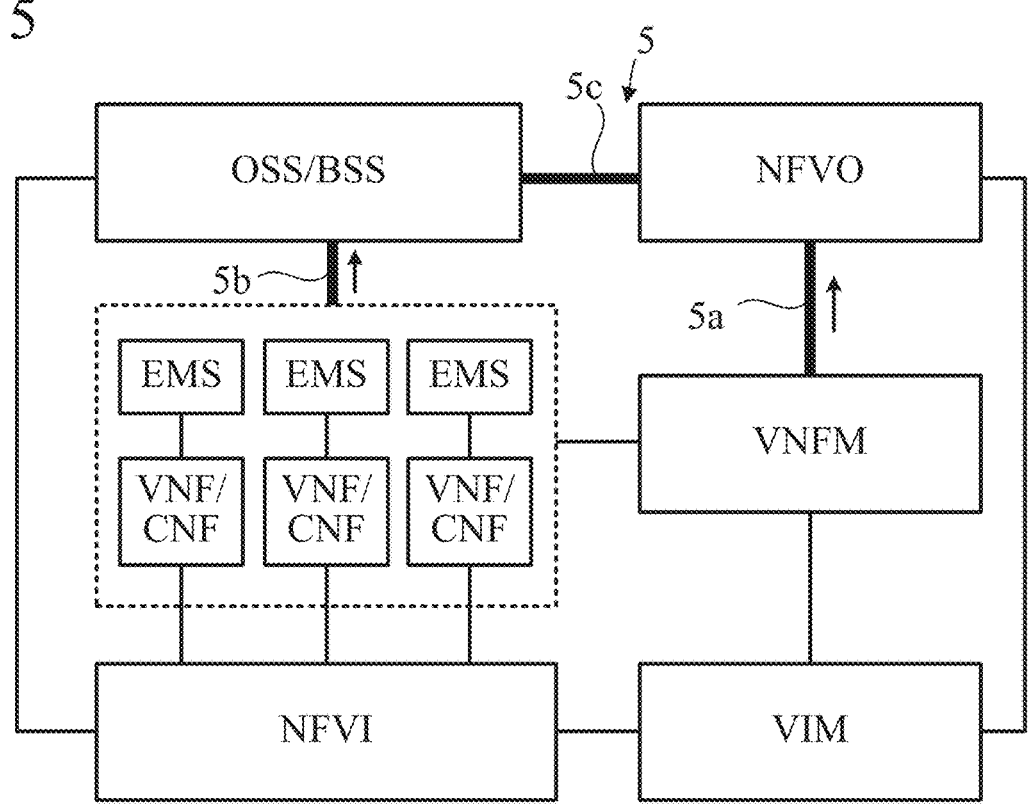
FIG. 5 is a block diagram illustrating the above components, and particularly illustrates an application monitoring network between the OSS/NFVO and the EMS/VNFM in an emphasized manner.

The thick solid line in FIG. 5 indicates an application monitoring network (second logical network) 5 between the OSS/NFVO and the EMS/VNFM. The application monitoring network 5 includes a network 5a between the NFVO and the VNFM, a connection 5b between the OSS and the EMS, and a connection 5c between the OSS and the NFVO.

The NFVO is connected to a plurality of VNFMs, and each VNFM reports a problem of an application of a VNF/CNF detected via the network 4a to the NFVO by using the network 5a. In a case in which the OSS controls auto-healing, the NFVO transfers a problem report to the OSS via the connection 5c.

The OSS/BSS is connected to a plurality of EMSs, and each EMS reports the problem of the application of the VNF/CNF detected via the connection 4b to the OSS/BSS via the connection 5b. In a case in which the OSS does not control auto-healing, the OSS transfers the problem report to the NFVO via the connection 5c. As described above, the application monitoring network 5 is used for reporting the application problem.

In a case in which the network 4a is not used for reporting the application problem, the network 5a is not used for reporting the application problem. In a case in which the connection 4b is not used for reporting the application problem, the connection 5b is not used for reporting the application problem.

Figure 6:
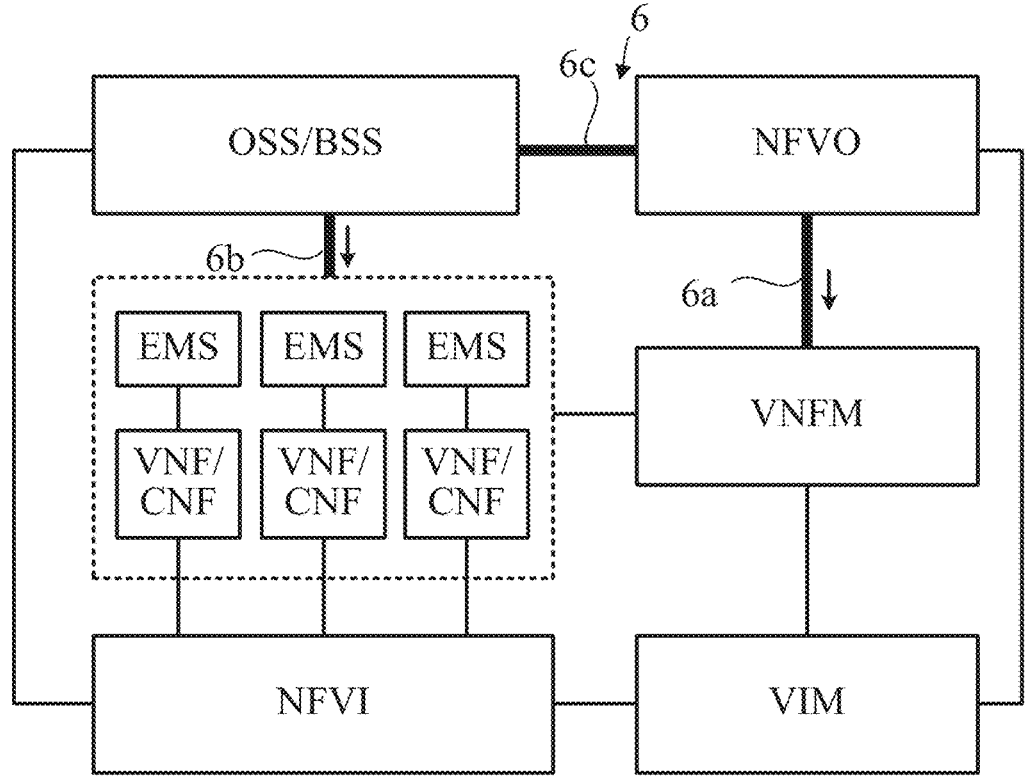
FIG. 6 is a block diagram illustrating the above components, and particularly illustrates an application control network between the OSS/NFVO and the EMS/VNFM in an emphasized manner.
Figure 7:
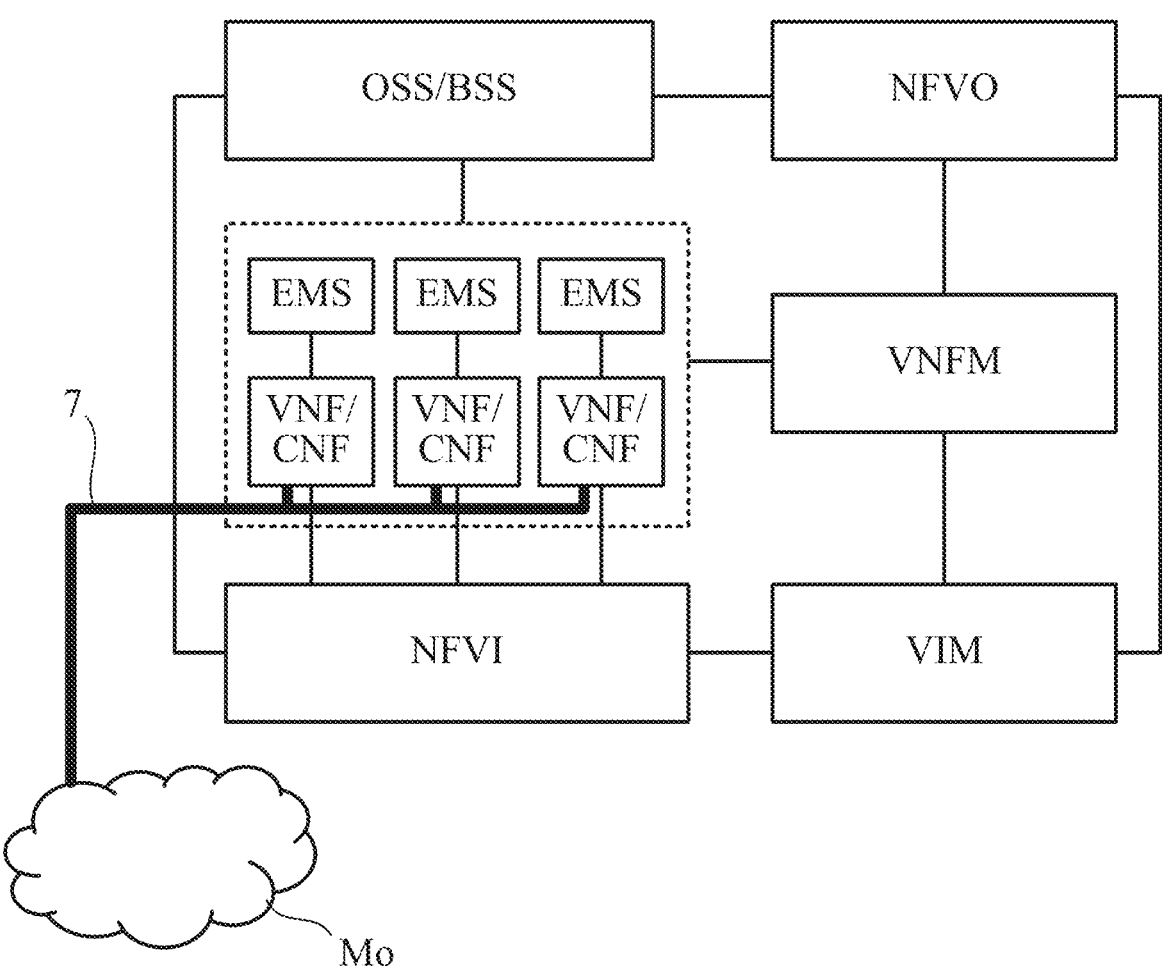
FIG. 7 is a block diagram illustrating the above components, and particularly illustrates a mobile service network in an emphasized manner.

The thick solid line in FIG. 6 indicates an application control network (third logical network) 6 between the OSS/NFVO and the EMS/VNFM. The application control network 6 includes a network 6a between the NFVO and the VNFM, a connection 6b between the OSS and the EMS, and a connection 6c between the OSS and the NFVO. That is, the same components as those of the application monitoring network 5 in FIG. 5 are involved in the application control network 6.

The application control network 6 is used to supply a setting command for optimizing the operation of the VNF/CNF created by the platform control network 3 of FIG. 3 (that is, incorporating the VNF/CNF into the operation) in the auto-healing.

In a case in which the OSS controls auto-healing, the OSS supplies an auto-healing command to the NFVO via the connection 6c, and the NFVO transfers the command to the VNFM corresponding to the created VNF/CNF via the network 6a. Alternatively, the OSS may supply the auto-healing command to the EMS corresponding to the created VNF/CNF via the connection 6b.

In a case in which the OSS does not control auto-healing, the NFVO supplies the auto-healing command to the OSS via the connection 6c, and the OSS transfers the command to the EMS corresponding to the created VNF/CNF via the connection 6b. Alternatively, the NFVO may supply the auto-healing command to the VNFM corresponding to the created VNF/CNF via the network 6a.

However, in a case in which the network 5a is not used for reporting the application problem, the network 6a is not used for application control in auto-healing. In a case in which the connection 5b is not used for reporting the application problem, the connection 6b is not used for application control in auto-healing.

The virtualization environment illustrated in FIGS. 1 to 6 may be used as a core network of a mobile network. As described above, the VNF/CNF may function as an element of an EPC or an element of an IMS.

Therefore, there is a network for the application (VNF/CNF) to provide mobile services. The thick solid line in FIG. 7 indicates a mobile service network (fourth logical network) 7 used for mobile services in the virtualization environment.

The mobile service network 7 connects a mobile network Mo and a plurality of VNFs/CNFs. The VNFs/CNFs communicate with the mobile network Mo via the mobile service network 7 and communicate with each other via the mobile service network 7.

While the above seven networks 1 to 7 are logically separated, the networks may also be physically separated depending on the network design. Therefore, a plurality of logical networks may belong to the same physical network or may belong to different physical networks.

Figure 8:
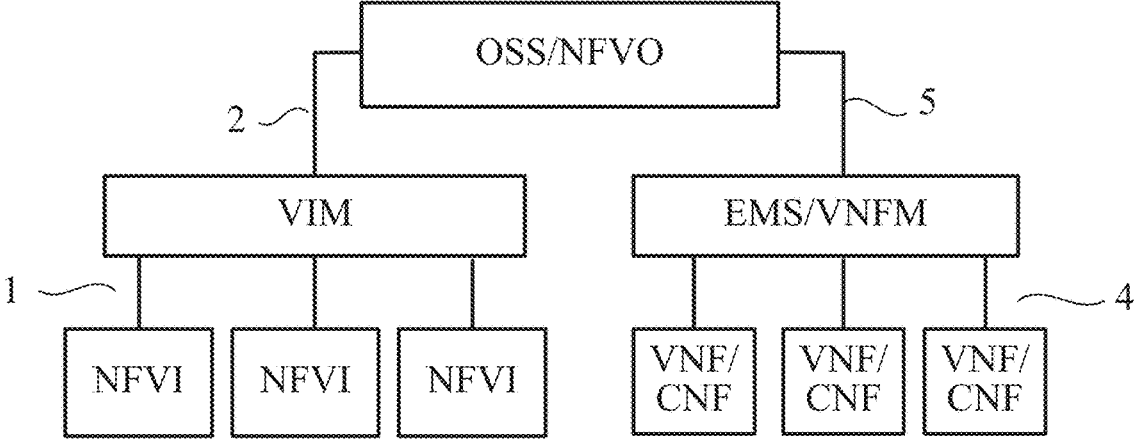
FIG. 8 is a diagram representing the network of FIGS. 1, 2, 4, and 5 from another viewpoint.

FIG. 8 is a diagram representing the platform monitoring network 1 of FIG. 1, the platform monitoring network 2 of FIG. 2, the application monitoring network 4 of FIG. 4, and the application monitoring network 5 of FIG. 5 from another viewpoint. The networks 1, 2, 4, and 5 can be represented by the hierarchical structure of FIG. 8.

In any of the logical networks 1 to 6, when a problem has occurred in a partial section of the network, the connection in the partial section may be disconnected.

As described above, when a problem has occurred in any of the logical networks 1 to 6, the OSS/NFVO may transmit a command to perform auto-healing. However, the availability of a service temporarily decreases during a period from an occurrence of the problem to the completion of auto-healing (until the created VNF/CNF is incorporated into the operation and the service can be resumed).

On the other hand, even though a problem has occurred in the platform monitoring networks 1 and 2 used for reporting a problem of a hardware resource on which the VNF/CNF operates, an application (service) of the VNF/CNF may operate normally. In a case in which a problem is reported from the platform monitoring networks 1 and 2, and a problem is not reported from the OSS/NFVO from the application monitoring networks 4 and 5, there is a high probability that the application of the VNF/CNF is operating normally, and there is merely a problem in the interface between any components involving the networks 1 and 2. Although a problem of the interface may have to be handled at some time, auto-healing does not need to be performed immediately in a case in which the application of the VNF/CNF is operating normally.

Therefore, in the present embodiment, a reception process of receiving a signal supplied when a problem is detected in any of the logical networks 1, 2, 4, and 5, in the network virtualization environment, and a first determination process of determining not to perform auto-healing in a case in which a problem is detected in the platform monitoring networks 1 and 2, but a problem is not detected in the application monitoring networks 4 and 5 are executed.

On the other hand, in a case in which a problem is detected in the application monitoring networks 4 and 5, auto-healing may be performed regardless of whether or not a problem is detected in the platform monitoring networks 1 and 2. However, in this case, there may merely be a problem in the interface between any components involving the networks 4 and 5. Therefore, as described later, the determination process may be further executed, and auto-healing may be performed in a case in which a predetermined condition is satisfied.

In the present embodiment, in a case in which a problem has occurred in a network implemented in a virtualization environment, it is possible to appropriately determine whether or not auto-healing is conducted in consideration of the type of the network problem. Then, by limiting unnecessary performing of auto-healing, the availability of a network is improved as compared with a case in which auto-healing is not limited.

In a case in which the application operates normally and the service can be provided, a problem does not occur in the mobile service network 7. Thus, the first determination process is irrelevant to the mobile service network 7.

The first determination process is also irrelevant to the platform control network 3 and the application control network 6 for performing auto-healing. Although the same components as those of the platform monitoring network 2 are involved in the platform control network 3, a problem in the platform monitoring network 2 does not necessarily mean a problem in the platform control network 3. The same components as the application monitoring network 5 are involved in the application control network 6, but a problem in the application monitoring network 5 does not necessarily mean a problem in the application control network 6.

However, in order to perform auto-healing, it is necessary that there is no problem in the platform control network 3 and the application control network 6.

In the present embodiment, the determination device that determines whether or not to perform auto-healing is provided. FIGS. 9 to 12 illustrate installation examples of the determination device, respectively.

Figure 9:
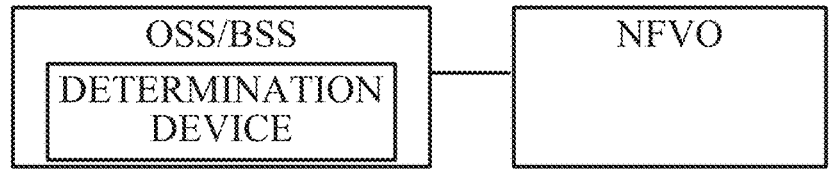
FIG. 9 is a diagram illustrating an installation example of a determination device according to the present disclosure.

In the example of FIG. 9, the determination device is provided in the OSS/BSS. This is suitable in a case in which the OSS controls auto-healing.

Figure 10:
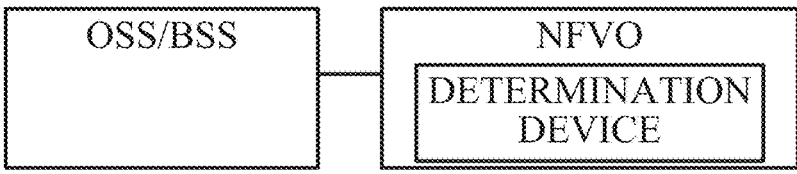
FIG. 10 is a diagram illustrating another installation example of the determination device according to the present disclosure.

In the example of FIG. 10, the determination device is provided at the NVFO. This is suitable in a case in which the OSS does not control auto-healing.

Figure 11:
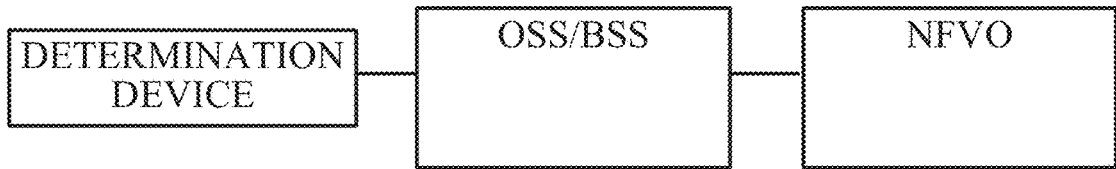
FIG. 11 is a diagram illustrating still another installation example of the determination device according to the present disclosure.

In the example of FIG. 11, the determination device is connected to the OSS/BSS. This is suitable in a case in which the OSS controls auto-healing.

Figure 12:
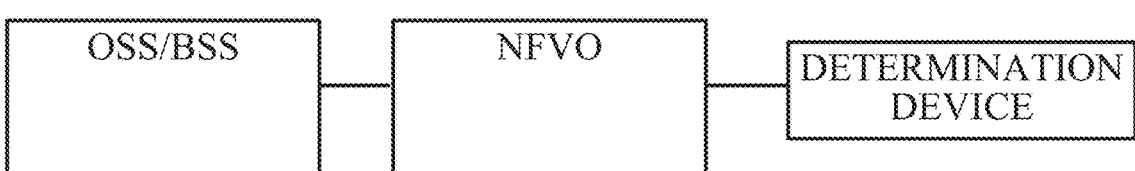
FIG. 12 is a diagram illustrating still yet another installation example of the determination device according to the present disclosure.

In the example of FIG. 12, the determination device is connected to the NVFO. This is suitable in a case in which the OSS does not control auto-healing.

Figures 13, 14:
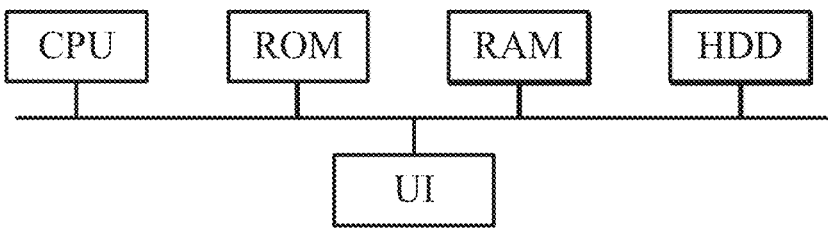
FIG. 13 is a block diagram illustrating an example of a hardware configuration of the determination device.
FIG. 14 is a table illustrating a relationship between a network problem and a determination result of the determination device.

As illustrated in FIG. 13, the determination device includes a central processing unit (CPU), that is, a processor, a read only memory (ROM), a random access memory (RAM), a hard disk drive (HDD), and a user interface (UI).

The ROM or the HDD stores a computer program required for an operation of the determination device. The ROM or the HDD stores data such as parameters required for the operation of the determination device.

The CPU executes a computer program stored in the ROM or the HDD while using data stored in the ROM or the HDD, and operates in accordance with the computer program.

The RAM is used as a work area of the CPU.

The UI may be a combination of a display device and a pointing device (for example, a mouse or a touch pad), or may be a touch panel having functions of both the display device and the pointing device. A user of the determination device can provide instructions to the CPU by using the UI.

In the installation examples of FIGS. 11 and 12, the determination device includes a communication interface (not illustrated) for communicating with the OSS or the NVFO.

FIG. 14 is a table illustrating a relationship between a network problem and the determination result of the determination device. Data corresponding to this table is stored in the ROM or the HDD of the determination device. When the OSS/NFVO receives a report indicating that one or more problems are detected in any of the logical networks 1, 2, 4, and 5, the OSS/NFVO supplies a signal requesting the determination to the determination device. Upon receiving the signal, the CPU of the determination device can determine whether or not to perform auto-healing by using the data corresponding to the table of FIG. 14.

As illustrated in FIG. 14, problems are classified into 16 problem patterns depending on whether or not there is a problem (1 or 0) in each of the logical networks 1, 2, 4, and 5. In Pattern 1, there is no problem in any of the networks 1, 2, 4, and 5, and there is no determination result (it is not necessary for the determination device to make a determination). In Patterns 2, 3, 4, 6, 7, 8, 10, 11, 12, 14, 15, and 16, there is a problem in at least one of the application monitoring networks 4 and 5, and the determination result is B. In Patterns 5, 9, and 13, there is a problem in at least one of the platform monitoring networks 1 and 2, but there is no problem in the application monitoring networks 4 and 5, and the determination result is A.

In a case in which the determination result is A, the application of the VNF/CNF is operating normally, and thus the CPU of the determination device determines not to perform auto-healing.

In a case in which the determination result is B, there is a probability that the application of the VNF/CNF is not operating normally. In this case, the CPU of the determination device may determine to perform auto-healing. However, in this case, there may merely be a problem in the interface between any components involving the networks 4 and 5. Therefore, as described later, the determination process may be further executed, and it may be determined that auto-healing is performed in a case in which a predetermined condition is satisfied.

Figure 15:
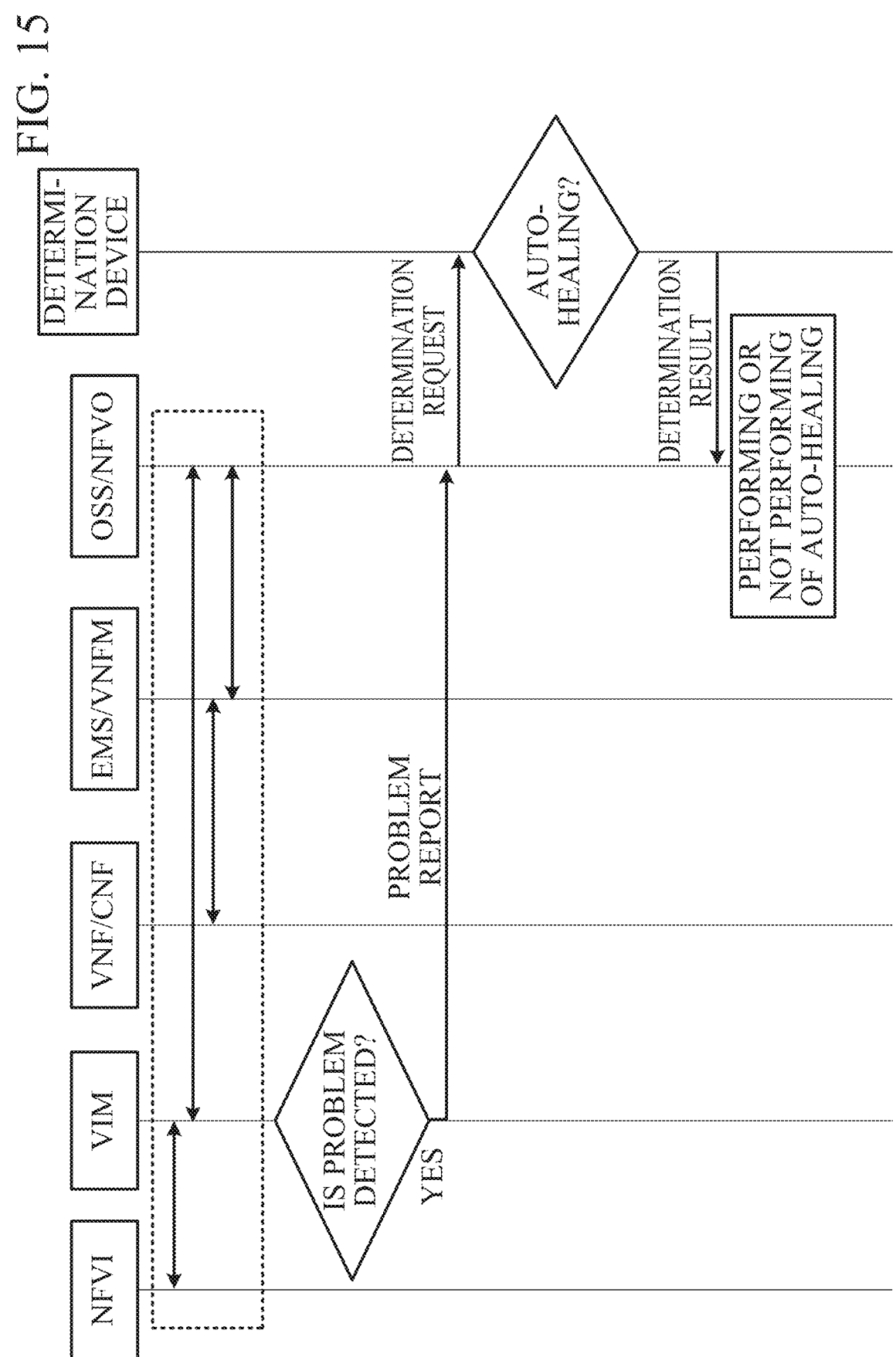
FIG. 15 is a sequence diagram illustrating an example of a process in the network virtualization environment according to the present disclosure.

The sequence diagram of FIG. 15 illustrates an example of a process in the virtualization environment according to the present embodiment. FIG. 15 corresponds to the problem pattern 9 of FIG. 14.

The inside of the rectangle indicated by broken lines in FIG. 15 shows signal exchange between the components in the networks 1, 2, 4, and 5.

In a case in which communication of the VIM with some NFVIs (servers) is not possible, that is, in a case in which a problem is detected in the platform monitoring network 1, the VIM records that the NFVI is unavailable. Then, the VIM transmits a problem report to the OSS/NFVO via the platform monitoring network 2. The problem report indicates that the NFVI is unavailable and that a problem is detected in the network 1.

Upon receiving the problem report, the OSS/NFVO records the problem report and transmits a determination request signal for requesting determination as to whether or not to perform auto-healing to the determination device. The determination request signal includes information for identifying the logical network in which the problem is detected. The determination request signal caused by the problem report from the VIM includes information for identifying that the problem is detected in the network 1.

Upon receiving the determination request signal, the CPU of the determination device determines whether or not to perform auto-healing. In the case of the problem pattern 9 in FIG. 14, the determination result is A. That is, the CPU of the determination device determines not to perform auto-healing.

The CPU of the determination device transmits the determination result as a response to the OSS/NFVO. In accordance with the determination result, the OSS/NFVO performs auto-healing or refrains from performing of auto-healing. In the case of the problem pattern 9 in FIG. 14, the OSS/NFVO refrains from performing of auto-healing.

Figure 16:
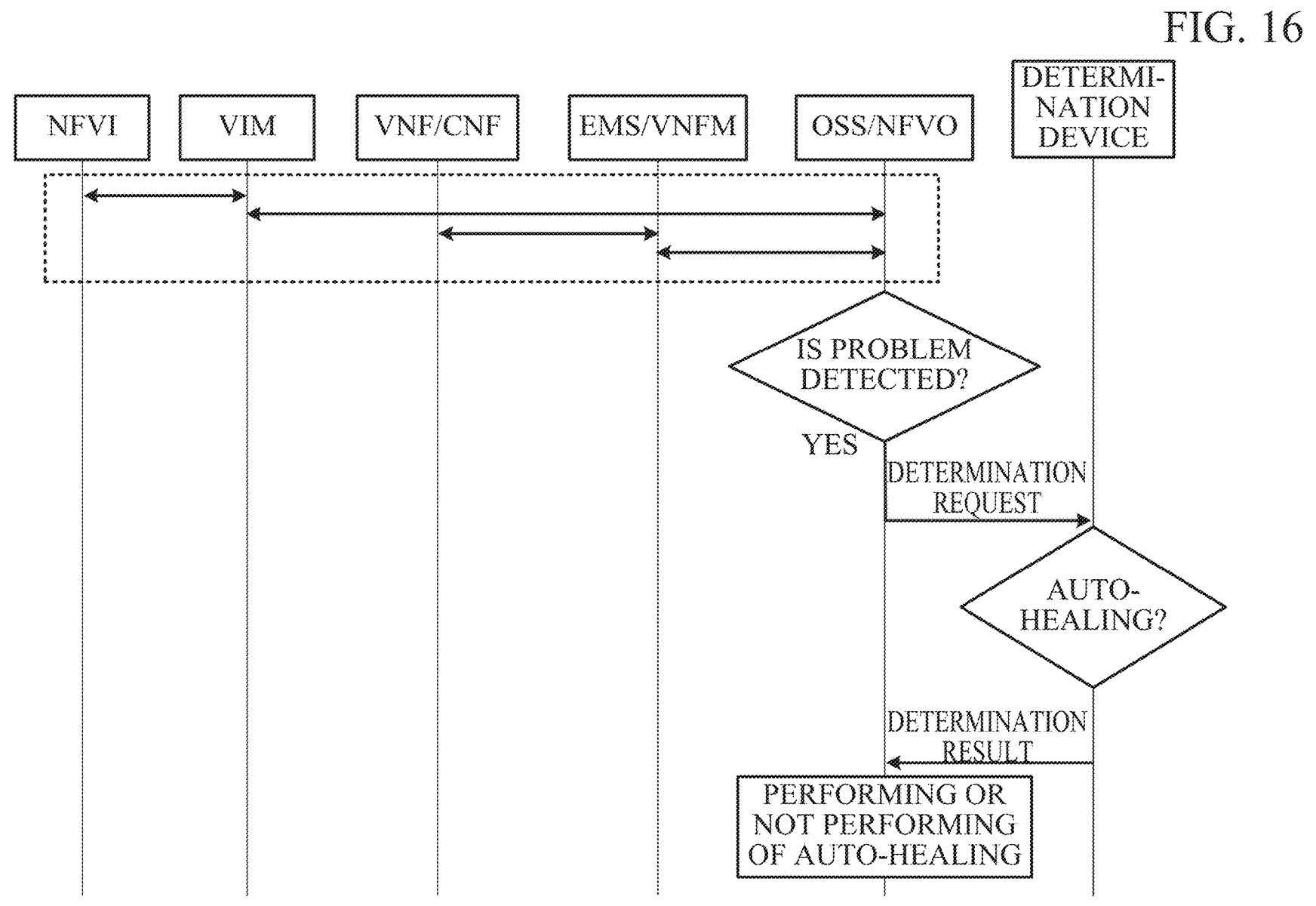

The sequence diagram of FIG. 16 illustrates another example of the process in the virtualization environment according to the present embodiment. FIG. 16 corresponds to the problem pattern 5 of FIG. 14.

The inside of the rectangle indicated by broken lines in FIG. 16 shows signal exchange between the components in the networks 1, 2, 4, and 5.

In a case in which communication of the OSS/NFVO with some VIMs is not possible, that is, in a case in which a problem is detected in the platform monitoring network 2, the OSS/NFVO records that the VIM is unavailable. Then, the OSS/NFVO transmits a determination request signal for requesting determination as to whether or not to perform auto-healing to the determination device. The determination request signal includes information for identifying the logical network in which the problem is detected. In a case in which a problem is detected in the platform monitoring network 2, the determination request signal includes information for identifying that a problem is detected in the network 2.

Upon receiving the determination request signal, the CPU of the determination device determines whether or not to perform auto-healing. In the case of the problem pattern 5 in FIG. 14, the determination result is A. That is, the CPU of the determination device determines not to perform auto-healing.

The CPU of the determination device transmits the determination result as a response to the OSS/NFVO. In accordance with the determination result, the OSS/NFVO performs auto-healing or refrains from performing of auto-healing. In the case of the problem pattern 5 in FIG. 14, the OSS/NFVO refrains from performing of auto-healing.

In the case of the problem pattern 13 of FIG. 14, the sequence diagram is a combination of FIG. 15 and FIG. 16, as one of those skilled in the art will appreciate.

In a case in which the determination device determines to perform auto-healing, the OSS/NFVO deletes a VNF/CNF having a problem via the platform control network 3, and deploys other hardware resources for the VNF/CNF (creates the VNF/CNF). Then, the OSS/NFVO performs setting for optimizing the operation of the created VNF/CNF (that is, incorporating the VNF/CNF into the operation) via the application control network 6.

Figure 17:
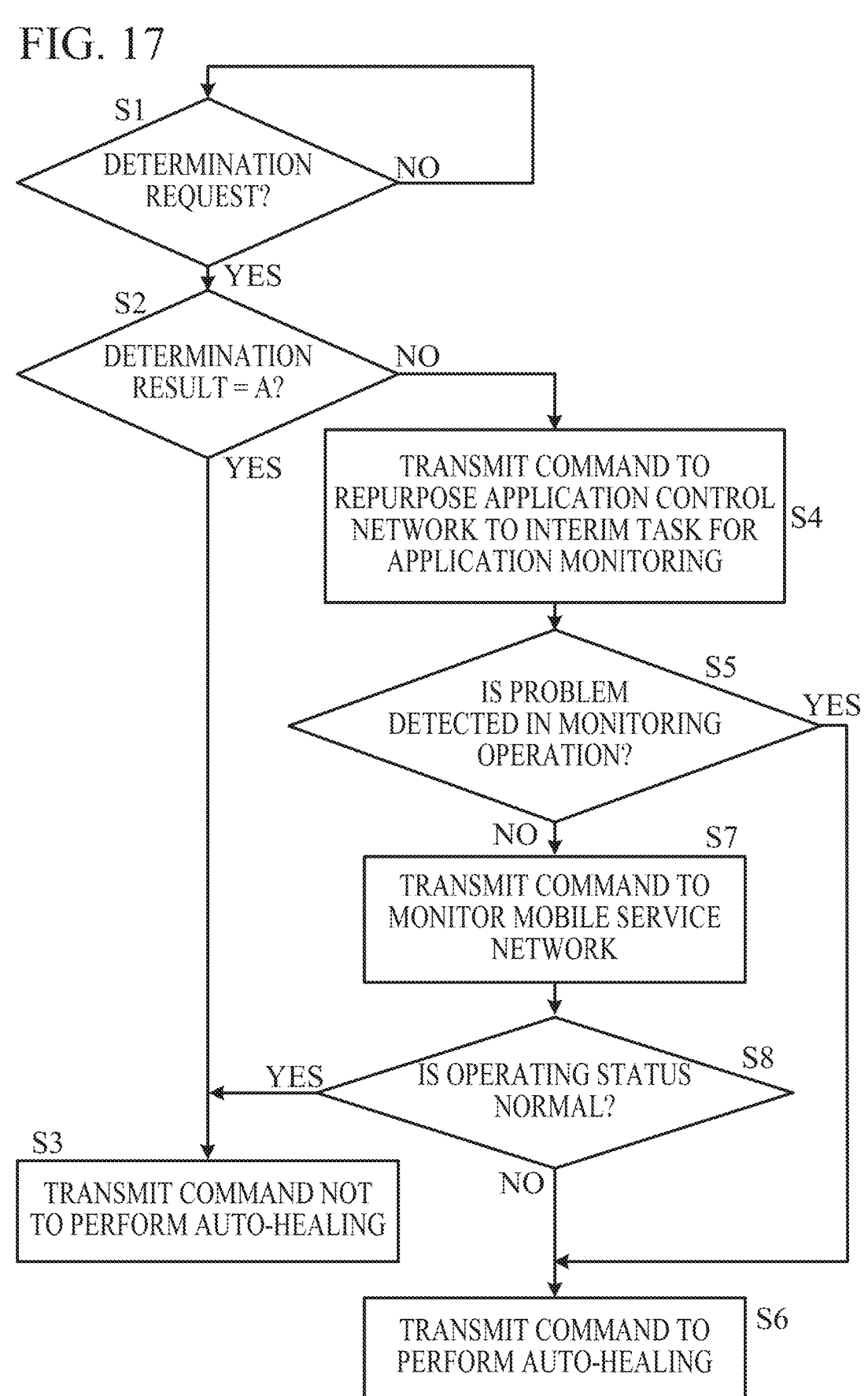
FIG. 17 is a flowchart illustrating a determination operation of the determination device.

Next, the determination operation of the CPU of the determination device will be described in more detail with reference to the flowchart of FIG. 17.

In Step S1, the CPU determines whether or not a determination request signal is received from the OSS/NFVO. When the determination in Step S1 is affirmative, the CPU determines whether the determination result is A or B in Step S2. In a case in which the determination result is A, the operation proceeds to Step S3, in which the CPU transmits a command not to perform auto-healing as a response to the OSS/NFVO as a determination result.

In a case in which the determination result is B (in a case in which a problem is detected in the application monitoring network 4 or 5), the CPU executes a first confirmation process. In the first confirmation process, the CPU repurposes the application control network (third logical network) 6 that is originally used for (configured for) application control for auto-healing in the virtualization environment to an interim task for an application monitoring, and confirms whether or not a problem is detected in application monitoring by the application control network 6. As described above, since the same components as those of the application monitoring network 5 are involved in the application control network 6, the network 6 can be temporarily used for application monitoring. When no problem is detected in the application monitoring operation by the network 6, it is assumed that there is no problem in the network 5. When a problem is detected in the application monitoring operation by the network 6, it is assumed that there is a problem in the application monitoring network 5.

That is, in a case in which the determination result is B, the operation proceeds to Step S4, in which the CPU transmits a command, to the OSS/NFVO, to repurpose the application control network 6 to an interim task for application monitoring. In response to the command, the OSS/NFVO temporarily uses the network 6 for application monitoring.

Specifically, the OSS/NFVO requests a response from a component (any VNFM) involved in the application control network 6 corresponding to the problem detected in the application monitoring network 5, confirms whether or not there is a response from the component, and transmits a confirmation result as a response to the CPU of the determination device. Additionally or alternatively, the OSS/NFVO confirms whether or not a component (OSS/NFVO or any VNFM) involved in the application control network 6 corresponding to the problem detected in the application monitoring network 5 detects any problem, and transmits a confirmation result as a response to the CPU of the determination device.

Thus, the first confirmation process in Step S4 includes requesting a response from the component and confirming whether or not there is a response from the component. Additionally or alternatively, the first confirmation process includes confirming whether or not the component detects a problem.

Then, in Step S5, the CPU determines whether or not a problem is detected in the application monitoring operation in the network 6. That is, in Step S5, the CPU executes a second determination process. Specifically, when the confirmation result from the OSS/NFVO indicates that there is no response from the component, the determination result in Step S5 is affirmative. When the confirmation result indicates that there is a response from the component, the determination result in Step S5 is negative. Additionally or alternatively, when the confirmation result from the OSS/NFVO indicates that some problem is detected, the determination result in Step S5 is affirmative. When the confirmation result indicates that no problem is detected, the determination result in Step S5 is negative.

In a case in which the determination result in Step S5 is affirmative, there is a high probability that the application of the VNF/CNF is not normally operating. Therefore, in Step S6, the CPU transmits a command to perform auto-healing as a response to the OSS/NFVO as a determination result. In response to the command, the OSS/NFVO performs auto-healing.

In a case in which the determination result in Step S5 is negative, the operation proceeds to Step S7. In Step S7, the CPU confirms whether or not a problem is detected in the mobile service network 7 by using the mobile service network 7 illustrated in FIG. 7. That is, in Step S7, the CPU executes the second confirmation process. Specifically, the CPU acquires an operating status of another VNF/CNF that communicates with the VNF/CNF corresponding to the problem detected in the application monitoring networks 4 and 5 via the mobile service network 7. The operating status can be acquired via the EMS/VNFM. The CPU transmits a command to monitor the mobile service network 7 to the OSS/NFVO, and the OSS/NFVO acquires the operating status of the target VNF/CNF via the EMS/VNFM and transmits the operating status as a response to the CPU of the determination device.

In a case in which the application of the VNF/CNF is normally operating, it is assumed that the operating status related to the mobile communication of another VNF/CNF that communicates with the VNF/CNF via the mobile service network 7 does not greatly vary. However, in a case in which the application of the VNF/CNF is not normally operated, it is assumed that the operating status related to the mobile communication of another VNF/CNF that communicates with the VNF/CNF via the mobile service network 7 greatly varies.

Therefore, the second confirmation process in Step S7 includes acquiring the operating status of another VNF/CNF that communicates with the VNF/CNF corresponding to the problem detected in the application monitoring networks 4 and 5 via the mobile service network 7 as an EPC or IMS.

FIG. 18 is a table illustrating examples of monitored items representing the operating status to be acquired. Data corresponding to this table is stored in the ROM or the HDD of the determination device. The accommodated user count decrease rate is a decrease rate of the number of UEs (User Equipment) for which the VNF/CNF provides the mobile service in a predetermined period. The packet loss rate increment is an increase rate of the packet loss rate in the mobile service provided by the VNF/CNF in a predetermined period. The CPS decrease rate is a decrease rate of calls per second (CPS) in the mobile service provided by the VNF/CNF in a predetermined period.

Then, in Step S8, the CPU determines whether or not the operating status of the VNF/CNF is normal. That is, in Step S8, the CPU determines not to perform auto-healing in a case in which a problem is not detected in the second confirmation process, and executes a third determination process of determining to perform auto-healing in a case in which a problem is detected in the second confirmation process.

For example, in a case in which the accommodated user count decrease rate exceeds a threshold value T1, the determination in Step S8 is negative. Even in a case in which the packet loss rate increment exceeds a threshold value T2, the determination in Step S8 is negative. Even in a case in which the CPS decrease rate exceeds a threshold value T3, the determination in Step S8 is negative. In a case in which the determination in Step S8 is negative, it is assumed that a problem has actually occurred in the VNF/CNF corresponding to the problem detected in the application monitoring networks 4 and 5. Therefore, the operation proceeds to Step S6, and the CPU transmits a command to perform auto-healing as a response to the OSS/NFVO as a determination result. In response to the command, the OSS/NFVO performs auto-healing.

In a case in which any of the monitored items illustrated in FIG. 18 does not exceed the threshold value, it is assumed that no problem has actually occurred in the VNF/CNF corresponding to the problem detected in the application monitoring networks 4 and 5. In this case, the determination in Step S8 is affirmative, the operation proceeds to Step S3, and the CPU transmits a command not to perform auto-healing as a response to the OSS/NFVO as a determination result.

As described above, in a case in which the above determination result is B (in a case in which a problem is detected in the application monitoring network 4 or 5), the operation proceeds to Steps S4 and S5, and further to Steps S7 and S8. Thus, in a case in which the application of the VNF/CNF is actually operating normally, it is possible to limit unnecessary auto-healing.

Steps S4 and S5 may be omitted. In this case, in a case in which the determination in Step S2 is negative, the operation directly proceeds to Step S7.

Steps S7 and S8 may be omitted. In this case, when the determination in Step S5 is negative, the operation directly proceeds to Step S6.

Although the present disclosure has been illustrated and described above with reference to preferred embodiments of the present disclosure, it will be understood by those skilled in the art that changes in form and details may be made without departing from the scope of the claims. Such changes, modifications, and corrections should fall within the scope of the present disclosure.

Aspects of the Present Disclosure are Also Set Forth in the Following Numbered Clauses:

[1] A network management apparatus including:

at least one processor configured to execute a reception process of receiving a signal supplied when a problem is detected in any of a plurality of logical networks in a network virtualization environment, and a first determination process of determining not to perform auto-healing in a case in which a problem is detected in a first logical network that is configured for platform monitoring and a problem is not detected in a second logical network that is configured for application monitoring.

[2] The network management apparatus according to [1], wherein the processor is configured to further execute a first confirmation process in a case in which a problem is detected in the second logical network, the processor repurposing a third logical network that is configured for application control in auto-healing in the virtualization environment to an interim task for an application monitoring and the processor confirming whether or not a problem is detected in application monitoring by the third logical network in the first confirmation process, the third logical network involving components that are the same as components in the second logical network, and a second determination process of determining to perform auto-healing in a case in which a problem is detected in application monitoring by the third logical network in the first confirmation process.

[3] The network management apparatus according to [2], wherein the first confirmation process includes requesting a response from a component involved in the third logical network corresponding to the problem detected in the second logical network, and confirming whether or not there is the response from the component.

[4] The network management apparatus according to [2] or [3], wherein the first confirmation process includes confirming whether or not a component involved in the third logical network corresponding to the problem detected in the second logical network detects a problem.

[5] The network management apparatus according to any one of [1] to [4], wherein the processor is configured to further execute a second confirmation process in a case in which a problem is detected in the second logical network, the processor using a fourth logical network that is configured for a mobile service in the virtualization environment and the processor confirming whether or not a problem is detected in the fourth logical network in the second confirmation process, and a third determination process of determining not to perform auto-healing in a case in which a problem is not detected in the fourth logical network in the second confirmation process, and determining to perform auto-healing in a case in which a problem is detected in the fourth logical network in the second confirmation process.

[6] The network management apparatus according to [5], wherein the second confirmation process includes acquiring an operating status of a VNF or a CNF that communicates with a VNF or a CNF corresponding to the problem detected in the second logical network via the fourth logical network.

[7] A network management method including:

receiving a signal supplied when a problem is detected in any of a plurality of logical networks in a network virtualization environment; and determining not to perform auto-healing in a case in which a problem is detected in a first logical network that is configured for platform monitoring and a problem is not detected in a second logical network that is configured for application monitoring.

What is claimed is:

1. A network management apparatus comprising:

at least one processor configured to execute a reception process of receiving a signal supplied when a problem is detected in any of a plurality of logical networks in a network virtualization environment, and a first determination process of determining not to perform auto-healing in a case in which a problem is detected in a first logical network that is configured for platform monitoring and a problem is not detected in a second logical network that is configured for application monitoring.

2. The network management apparatus according to claim 1, wherein the processor is configured to further execute a first confirmation process in a case in which a problem is detected in the second logical network, the processor repurposing a third logical network that is configured for application control in auto-healing in the virtualization environment to an interim task for an application monitoring and the processor confirming whether or not a problem is detected in application monitoring by the third logical network in the first confirmation process, the third logical network involving components that are the same as components in the second logical network, and a second determination process of determining to perform auto-healing in a case in which a problem is detected in application monitoring by the third logical network in the first confirmation process.

3. The network management apparatus according to claim 2, wherein the first confirmation process includes requesting a response from a component involved in the third logical network corresponding to the problem detected in the second logical network, and confirming whether or not there is the response from the component.

4. The network management apparatus according to claim 2, wherein the first confirmation process includes confirming whether or not a component involved in the third logical network corresponding to the problem detected in the second logical network detects a problem.

5. The network management apparatus according to claim 1, wherein the processor is configured to further execute a second confirmation process in a case in which a problem is detected in the second logical network, the processor using a fourth logical network that is configured for a mobile service in the virtualization environment and the processor confirming whether or not a problem is detected in the fourth logical network in the second confirmation process, and a third determination process of determining not to perform auto-healing in a case in which a problem is not detected in the fourth logical network in the second confirmation process, and determining to perform auto-healing in a case in which a problem is detected in the fourth logical network in the second confirmation process.

6. The network management apparatus according to claim 5, wherein the second confirmation process includes acquiring an operating status of a VNF or a CNF that communicates with a VNF or a CNF corresponding to the problem detected in the second logical network via the fourth logical network.

7. A network management method comprising:

receiving a signal supplied when a problem is detected in any of a plurality of logical networks in a network virtualization environment; and determining not to perform auto-healing based on a problem being detected in a first logical network that is configured for platform monitoring and a problem not being detected in a second logical network that is configured for application monitoring.

* * * * *